W. C. YEOMANS.
VALVE.
APPLICATION FILED MAY 27, 1918.

1,296,897.

Patented Mar. 11, 1919.

INVENTOR:
Wallace C. Yeomans
BY
Pierre Barnes
ATTORNEY

UNITED STATES PATENT OFFICE.

WALLACE C. YEOMANS, OF PE ELL, WASHINGTON.

VALVE.

1,296,897.  Specification of Letters Patent.  Patented Mar. 11, 1919.

Application filed May 27, 1918. Serial No. 236,761.

*To all whom it may concern:*

Be it known that I, WALLACE C. YEOMANS, a citizen of the United States, residing at Pe Ell, in the county of Lewis and State of Washington, have invented certain new and useful Improvements in Valves, of which the following is a specification.

This invention relates to improvements in the construction of self-grinding valves; and its object is to produce a more simple, durable and efficient device of this character.

The invention consists in the novel construction, arrangement, and combination of parts as will be hereinafter described and illustrated in the accompanying drawings, in which—

Figure 1:
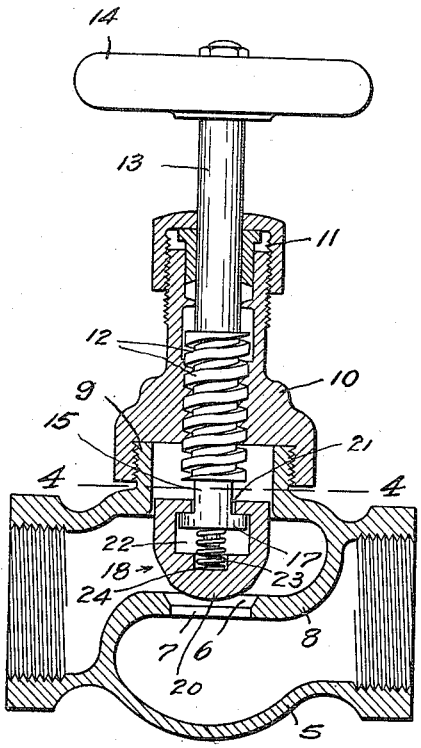
Figure 2:
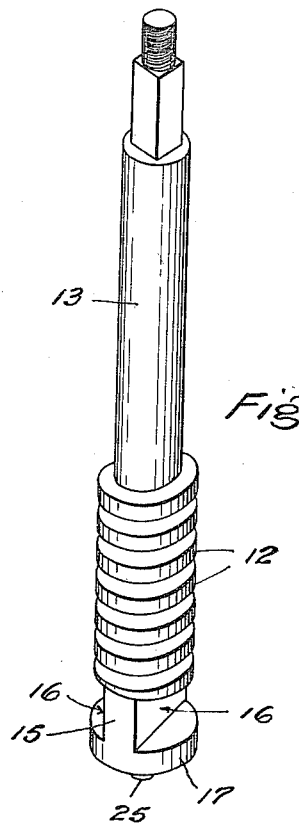
Figure 3:
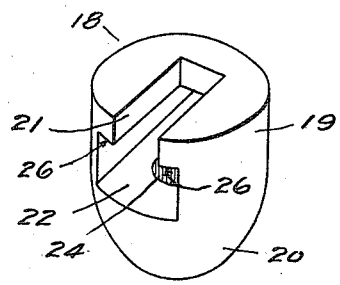
Figure 4:
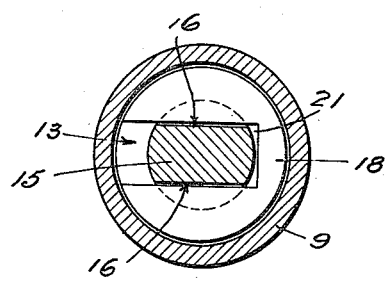

Figure 1 is a longitudinal vertical sectional view of the valve. Fig. 2 is a perspective view of the valve spindle. Fig. 3 is a similar view of the valve body. Fig. 4 is a horizontal section through 4—4 of Fig. 1.

In said drawings the reference numeral 5 designates the casing of a valve of the globe type having a seat 6 provided about an aperture 7 formed in the valve partition 8. Removably secured to a tubular boss 9 of the casing is a bonnet 10 having at its upper end a stuffing-box 11. Said bonnet is internally threaded for engaging screw threads 12 of the valve stem 13 to afford axial movements thereto when rotated by means of a hand wheel 14, or an equivalent. Said stem is notched at opposite sides to furnish a neck 15 with substantially parallel side faces 16 between the threaded portion and a head 17.

18 represents a valve-body comprised of a single piece of suitable material with an upper portion 19 of a cylindrical form, preferably of a diameter slightly less than the internal diameter of the boss 9, and with a lower portion 20 of a conoidal or other suitable shape. The valve-body is provided in its top with a diametrically disposed slot 21 of a width equal to or slightly greater than that of the stem neck 15. Provided in the body below the slot is a recess 22 which constitutes with the aforesaid slot a groove of an inverted T shape in transverse section to accommodate the stem head 17 and neck 15 and afford axial movement to the body relative of the stem.

23 represents a helical spring extending from the head 17 into a hole 24 extending from the bottom of the recess 22, said head being provided with a depending stud 25 for retaining the spring axially of the stem. The valve body 18 is applied to the stem 13 while the latter is removed with the bonnet 10 from the casing.

In operation, the valve-body 18 is caused to be rotated with the stem 13 through the medium of the stem neck 15 engaging the body at opposite sides of the slot 21. The spring tends to normally hold the shoulders 26 of the valve-body against the stem head and, when closing the valve, the spring 23 yields to allow the stem to be screwed down after the valve-body has become seated, thereby grinding the seat.

When the valve is closing and opening, the valve-body 18 is prevented from becoming displaced axially of the stem 13 by being guided by the valve seat and the boss 9.

By constructing the valve body integral with devices by which it is rotatably secured to the stem, the present invention affords superior strength and enables the valve-body being quickly and readily replaced by a lateral movement without the necessity of disengaging any screw-couplings such as usually employed with valves of this type in order to removably secure the body to a stem which, when rusted, oftentimes requires to be broken in order to detach the same.

What I claim as my invention, is—

1. The combination with a valve spindle having a flat sided neck and a head on the inner end thereof, of a one-piece valve body having a transverse undercut groove in one end thereof forming a passage into which the neck and head are introduced laterally, said head being of less thickness than the depth of the undercut portion of the groove and the flat sides of the neck engaging the adjacent side walls of the groove whereby said valve body will be positively rotated and longitudinal movement of the valve spindle relative to the valve body may be had upon rotation of the spindle after the valve body has seated, and a compression spring carried by the valve body between the bottom of the undercut groove and the spindle head.

2. The combination with a valve casing provided with a tubular boss and a partition formed with a circular seat, and an internally threaded bonnet carried by said boss, of a valve spindle in threaded engagement with said bonnet and having a flat sided neck and a head on the inner end thereof, and a relatively large one-piece valve body of slightly smaller diameter than the internal diameter of said boss and guided by the latter, said valve body having a transverse undercut groove in one end thereof forming a passage into which the spindle neck and head are introduced laterally, said head being of less thickness than the depth of the undercut portion of the groove and the flat sides of the neck engaging the adjacent side walls of the groove whereby said valve body will be positively rotated and longitudinal movement of the valve spindle relative to the valve body may be had upon rotation of the valve spindle after the valve body has seated upon said seat.

Signed at Pe Ell, Washington, this 16th day of May 1918.

WALLACE C. YEOMANS.

Witnesses:
 PIERRE BARNES,
 HANNAH JONES.